United States Patent
Blom et al.

(10) Patent No.: US 8,868,912 B2
(45) Date of Patent: *Oct. 21, 2014

(54) METHOD AND APPARATUS FOR ESTABLISHING A SECURITY ASSOCIATION

(75) Inventors: Rolf Blom, Järfälla (SE); Karl Norrman, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/348,343

(22) Filed: Jan. 11, 2012

(65) Prior Publication Data

US 2012/0166802 A1 Jun. 28, 2012

Related U.S. Application Data

(63) Continuation of application No. 11/305,329, filed on Dec. 19, 2005, now Pat. No. 8,122,240, which is a continuation-in-part of application No. 11/248,589, filed on Oct. 13, 2005, now abandoned.

(51) Int. Cl.

| | |
|---|---|
| *H04L 29/06* | (2006.01) |
| *H04W 12/04* | (2009.01) |
| *H04L 29/08* | (2006.01) |
| *H04L 9/32* | (2006.01) |
| *H04L 9/08* | (2006.01) |
| *H04W 84/04* | (2009.01) |

(52) U.S. Cl.
CPC ............ *H04W 12/04* (2013.01); *H04W 84/042* (2013.01); *H04L 63/062* (2013.01); *H04L 2209/80* (2013.01); *H04L 67/26* (2013.01); *H04L 2209/56* (2013.01); *H04L 63/0435* (2013.01); *H04L 9/3271* (2013.01); *H04L 9/0841* (2013.01)
USPC .......................................... 713/171; 380/270

(58) Field of Classification Search
None
See application file for complete search history.

(56) References Cited

U.S. PATENT DOCUMENTS

| | | | |
|---|---|---|---|
| 4,656,474 A | 4/1987 | Mollier et al. | |
| 2003/0051140 A1 | 3/2003 | Buddhikot et al. | |

(Continued)

FOREIGN PATENT DOCUMENTS

| | | |
|---|---|---|
| JP | 61-26111 | 6/1986 |
| JP | 2003-188874 | 7/2003 |
| WO | 03/015360 A2 | 2/2003 |
| WO | 2006/085207 A1 | 8/2006 |

OTHER PUBLICATIONS

International Search Report and Written Opinion mailed May 3, 2007 in corresponding PCT application PCT/EP2006/067225.

(Continued)

*Primary Examiner* — Gilberto Barron, Jr.
*Assistant Examiner* — Simon Kanaan
(74) *Attorney, Agent, or Firm* — Nixon & Vanderhye, P.C.

(57) ABSTRACT

A method for establishing a security association between a client and a service node for the purpose of pushing information from the service node to the client, where the client and a key server share a base secret. The method comprises sending a request for generation and provision of a service key from the service node to a key server, the request identifying the client and the service node, generating a service key at the key server using the identities of the client and the service node, the base secret, and additional information, and sending the service key to the service node together with said additional information, forwarding said additional information from the service node to the client, and at the client, generating said service key using the received additional information and the base key. A similar approach may be used to provide p2p key management.

29 Claims, 6 Drawing Sheets

(56) References Cited

U.S. PATENT DOCUMENTS

| | | |
|---|---|---|
| 2003/0072454 A1 | 4/2003 | Krawetz |
| 2005/0149758 A1 | 7/2005 | Park |
| 2005/0289347 A1 | 12/2005 | Ovadia |
| 2006/0174117 A1 | 8/2006 | Laitinen |
| 2007/0042754 A1 | 2/2007 | Bajikar et al. |
| 2007/0086590 A1 | 4/2007 | Blom |

OTHER PUBLICATIONS

Universal Mobile Telecommunications System (UMTS), ETSI Standards, EP Telecommunications Standards Institute, Sophia-Antipo, FR, vol. 3-SA3, No. V660, Sep. 2005.

Universal Mobile Telecommunications System (UMTS), ETSI Standards, EP Telecommunications Standards Institute, Sophia-Antipo, FR, vol. 3-SA3, No. V500, Mar. 2002.

U.S. Office Action mailed Jan. 6, 2009 in related U.S. Appl. No. 11/248,589.

Office Action mailed Jun. 29, 2009 in related U.S. Appl. No. 11/248,589 (21 pages).

Office Action mailed Jan. 11, 2010 in related U.S. Appl. No. 11/248,589 (21 pages).

Alfred J. Menezes et al., "Handbook of Applied Cryptography", 1997, CRC Press, Inc., p. 499 (3 pages total).

METHOD AND APPARATUS FOR ESTABLISHING A SECURITY ASSOCIATION

RELATED APPLICATIONS

This application is a Continuation of Ser. No. 11/305,329 filed Dec. 19, 2005, now U.S. Pat. No. 8,122,240, which is a Continuation-in-part of Ser. No. 11/248,589, filed Oct. 13, 2005, now abandoned, the entire contents of each of which are hereby incorporated by reference in this application.

FIELD OF THE INVENTION

The present invention relates to a method and apparatus for establishing a security association between a client terminal and a service node in order to deliver a push-type service and in particular, though not necessarily, to such a method and apparatus which employs a Generic Bootstrapping Architecture.

BACKGROUND TO THE INVENTIONS

In order to facilitate the provision of services to user terminals, a mobile network such as a 3G network will often require the establishment of a secure communication channel or "security association" between client terminals (i.e. mobile terminals) and the network-based service nodes which provide the services. The Generic Bootstrapping Architecture (GBA) is discussed in the 3GPP Technical Specification TS 33.220 and provides a mechanism whereby a client terminal (UE) can be authenticated to a Network Authentication Function (the service node), and secure session keys obtained for use between the client terminal and the Network Authentication Function. The simple network model for this architecture is illustrated in FIG. 1. This mechanism bootstraps upon the known Authentication and Key Agreement (AKA) procedure [3GPP TS 33.102] which allows a client terminal to be authenticated to a Bootstrapping Server Function (BSF) of the client's home network on the basis of a secret K which is shared between the USIM of the client terminal and the Home Subscriber System (HSS) of the subscriber's home network. The AKA procedure further establishes session keys from which keys are derived that are afterwards applied between the client terminal and a Network Application Function (NAF). When a client terminal and NAF wish to obtain session keys from the BSF, the NAF sends a transaction identifier to the BSF, the transaction identifier containing an index which the BSF uses to identify the client terminal and appropriate keys which it forwards to the NAF.

According to the GBA mechanism, a UE initiates the key generation process by sending a request containing a user identity to the BSF. The request also contains the identity of the NAF. The BSF retrieves an authentication vector from the Home Subscriber System (HSS), each authentication vector consisting of a random number RAND, an expected response XRES, a cipher key CK, an integrity key IK and an authentication token AUTN. The BSF generates key material KS by concatenating CK and IK contained within the authentication vector. The BSF generates a key identifier B-TID in the format of a NAI by base64 encoding the RAND value and combining the encoded value with the BSF server name, i.e. as base64encode(RAND)@BSF_servers_domain_name.

The BSF retains the key KS in association with the transaction identifier B-TID and the NAF identity. The B-TID and AUTN are sent by the BSF to the UE, the USIM of the client terminal verifying the value AUTN using the shared secret K and returning a digest of the expected result XRES to the BSF. The USIM also generates the key material KS using the secret K and the value RAND (recovered from the B-TID).

Following completion of this procedure, the UE communicates to the NAF, the received B-TID. The NAF and the BSF are authenticated to one another, and the NAF sends to the BSF the received B-TID together with its own identity. The BSF uses the B-TID and the identity of the NAF to locate the correct key KS, and uses KS to generate a NAF key. Other information such as the NAF identity is also used in the generation of the NAF key. The generated NAF key is returned to the NAF. The UE is similarly able to generate the NAF key using the key KS that it has already generated.

After the GBA mechanism has been run for the first time, subsequent requests to establish a security association between the UE and the same or a different NAF may use the already established key material KS, providing that key has not expired. However, this will still require that the UE initiate a request for establishment of a security association by sending its B-TID to the NAF.

SUMMARY OF THE INVENTION

There are occasions on which it is desirable to allow the NAF to initiate the establishment of a security association with the UP. For example, one might consider a push-type service, which delivers news, sports, and financial, etc information to users who have previously registered for a service. A typical operational procedure to achieve this might be for the service provider to send an SMS message to the UE which requests the user to open a secure connection. However, there are many threats related to this model as an SMS might be manipulated, sent by an unauthorized party, be replayed, etc. if a security association existed, or the service node could initiate one, before the actual service data is sent, security procedures could be based on this and most problems could be mitigated.

According to a first aspect of the present technology there is a provided method of establishing a security association between a first node and a second node (e.g., a client terminal) for the purpose of pushing information from the first node (e.g., a service node) to the second node, where the second node and a key generation function share a base secret, the method comprising:
  sending a request for generation and provision of a service key from the first node to the key generation function, the request containing identities of the first and second nodes;
  generating the service key at the key generation function using the identity of the first node, the base secret, and additional information, and sending the service key to the first node together with said additional information;
  forwarding said additional information and said identity of the first node from the first node to the second node; and
  at the second node, generating said service key using the received additional information, the first user node identity, and the base secret.

It will be appreciated that the key generation function may be a stand-alone node or may be a distributed server. In the case of a 3G network employing the Generic Bootstrapping Architecture, a Bootstrapping Server Function and a Home Subscriber Server may together provide the key generation function, where the Bootstrapping Server Function communicates with the service node and with the Home Subscriber Server. In the case of a 2G network, the key generation function may be a combination of a Bootstrapping Server Function and an AuC (Authentication Centre) server.

In the case of a 3G network employing the Generic Bootstrapping Architecture, the service node comprises a Network Application Function. The step of generating a service key at the key generation function comprises the steps of:
generating key material KS using said base secret; and
generating the service key using said key material KS, the identity of the first node, and said additional information.

The step of generating the service key at the second node may also comprises these two steps.

Said step of generating a service key at the key generating function may utilise values other than those sent to the first node by the service second node. The client second node may obtain certain of those other values from the key server generating function.

Said additional information may comprise one or more of
a random value;
time stamp;
sequence number;
other identifiers In the case of the Generic Bootstrapping Architecture, said random value is the RAND parameter and is carried within the B-TID.

Said additional information may comprise a transaction identifier in the format of an NAI, and comprising an encoded random value.

Said additional information may be forwarded from the service first node to the second in a message also containing service data, the service data being encrypted with the service key, wherein the second node can decrypt the encrypted data once it has generated the service key.

In one example embodiment, the key generation function sends to the first node a network authentication value. The first node forwards this value to the second node, together with said additional information. The second node uses the base secret and the authentication value to authenticate the key generation function. Only if the key generation function is authenticated does the client second node generate and use the service key.

In an alternative embodiment of the technology, the client second node requests an authentication value from the key generation function after it has received said additional information from the first node. Only when the second node has authenticated the key generation function is the service key generated and used.

The second node may comprise means for receiving from the first node a message authentication code, the second node comprising means for generating an authentication key or keys from at least a part of the key generation information, and using the authentication key(s) to authenticate the message authentication code. The generation means may be a USIM/ISIM.

Said service key may be a Diffie-Hellman key for the second node, the method further comprising the step of providing to the first node a Diffie-Hellman key for that first node, and sending the Diffie-Hellman key for the first node to the second node, said security association being established on the basis of the two Diffie-Hellman keys.

According to a second aspect of the present invention there is provided a service node for delivering a push service to a client via a secure communication link, the service node comprising:
means for sending a request for generation and provision of a service key to a key generation function, the request identifying the client and the service node;
means for receiving from the key generation function a service key together with said additional information;
means for forwarding said additional information to the client; and
means for encrypting and/or integrity protecting service information using the service key and for sending the encrypted and/or protected information to the client.

In the case of the Generic Bootstrapping Architecture, said additional information comprises a B-TID containing the RAND value. Said means for forwarding is also arranged to forward to the client an identity of the service node.

According to a third aspect of the invention there is provided a client terminal for receiving a pushed service delivered by a service node, the client terminal comprising:
memory means for storing a secret that is shared with a key generation function;
means for receiving from said service node, key generation information;
means for generating a service key using said shared secret and said key generation information; and
means for using said service key to decrypt and/or verify the integrity of communications with the service node.

According to a fourth aspect of the present technology there is provided a key generation function for use in establishing a security association between a client and a service node for the purpose of pushing information from the service node to the client, the key generation function comprising:
memory means for storing a secret that is shared with said client;
means for receiving a request for generation and provision of a service key from said service node, the request identifying the client and the service node; and
means for generating a service key using the identities of the client and the service node, the base secret, and additional information, and for sending the service key to the service node together with said additional information.

According to a fifth aspect of the present technology there is provided a method of establishing a security association between first and second clients for the purpose of pushing information from the first client to the second client, where the first and second clients have trust relationships with first and second key servers respectively and share a secret with their respective key servers, the method comprising:
sending a request for generation and provision of a service key from the first client to said second key server via the first key server, the request identifying the first and second clients;
generating the service key at the second key server using the identity of the first client, the base secret, and additional information, and sending the service key to the first client together with said additional information;
forwarding said additional information from the first node client to the second client; and
at the second client, generating said service key using the received additional information and the base secret.

According to a sixth aspect of the present technology there is provided a method of protecting a second node against replay attacks, the method comprising:
generating a service key at a bootstrapping server function;
providing the service key to a first node together with information required to generate the service key;
sending a key generation message from the first node to the second node, the message including said information, a replay prevention value, and a message authentication code calculated over the message body including the replay prevention value, the replay prevention value being incremented or decremented for each run of the procedure;

receiving said key generation message at said second node and storing the replay prevention value contained therein; and at the second node, each time a key generation message is received, verifying said message authentication code, determining whether or not the replay prevention value contained in the message has already been stored at the second node, and, if yes, rejecting the message.

Embodiments of this aspect of the invention allow the second node to reject replay attacks based upon messages previously sent to the second node in respect of a valid GBA procedure. If the attacker were to merely increment that replay prevention value to a previously unused value, the second node would detect this change based upon the incorrect MAC value, and would hence detect the attack. Again, the first node may be a NAF server, with the second node being a client, or both the first and second nodes may be clients. It will be appreciated that features of the first to lift aspects of the present invention may be combined with those of the sixth aspect, and vice versa.

BRIEF DESCRIPTION OF THE DRAWINGS

FIGS. 9, 10 and 11 illustrate example embodiments of a service node, a client terminal, and a key generation function.

DETAILED DESCRIPTION OF CERTAIN EMBODIMENTS

Figure 1:
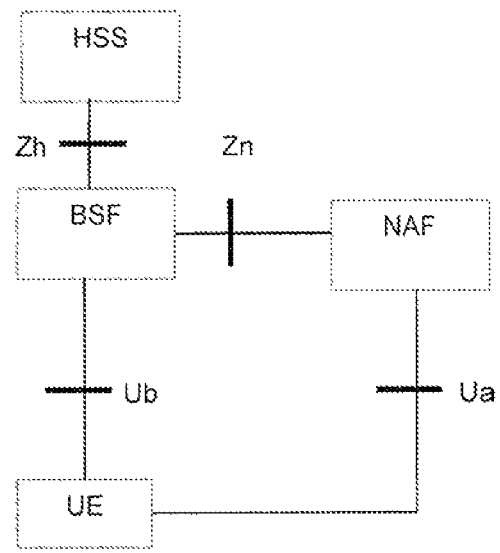
FIG. 1 illustrates a simple network model for the Generic Bootstrapping Architecture.

The general Generic Bootstrapping Architecture (GBA) for 3G networks has been described with reference to FIG. 1, which illustrates the interfaces (Ua, Ub, Zn, and Zh) between the various entities. It should be borne in mind that the description is on a relatively high level and actual implementations may "look" different whilst employing the same general functionality. For example, it is possible that when a BSF receives a service key request from a NAF (as will be described below), the receiving BSF must perform an address resolution step to identify a "serving" BSF for the NAF or client (UE) and, if the receiving BSF is not the serving BSF, the request is forwarded on to the serving BSF.

This discussion concerns the provision of a push service to a client. Typically, the client will have pre-registered with the service provider, but the initiative to push particular information is taken by the service provider. In such a situation, the service provider and the client will not already have a security association established with each other (security associations are typically short-lived), and one must be established.

A first solution proposed here takes the approach that the NAF asks the BSF for a NAF (or service) key. The BSF returns to the NAF, the NAF key together with the client transaction identifier (B-TID) and the corresponding network authentication value (AUTN). As has been stated above, the B-TID contains the encoded RAND value (as the NAI prefix), which can be used by the client to derive the base key (KS). The NAF can now compose a message containing the B-TID, AUTN, and further data including the NAF identity that the client requires in order to derive the NAF key, and send this message to the client. This message can be a message that only triggers the set-up of a SA (i.e. sharing of a service key) or it could contain service data (i.e. payload data) encrypted with the service key. In both cases, the values B-TID, AUTN, and other data required by the client to generate KS are sent in plain text but are "signed" with a Message Authentication Code. Note that the key(s) in the SA are derived using the key shared between the HSS and the UE, and that the AUTN is included in the message. It is therefore not possible to "spoof" messages even though the key used for integrity protecting the message is derived from the very SA it is intended to establish.

When the client receives the message, it retrieves the RAND part of the B-TID (by reversing the encoding) and the AUTN and applies them to the USIM/ISIM to derive the base key Ks. Then it uses the further data to derive the NAF key, and verifies the received message using the MAC.

Figure 2:
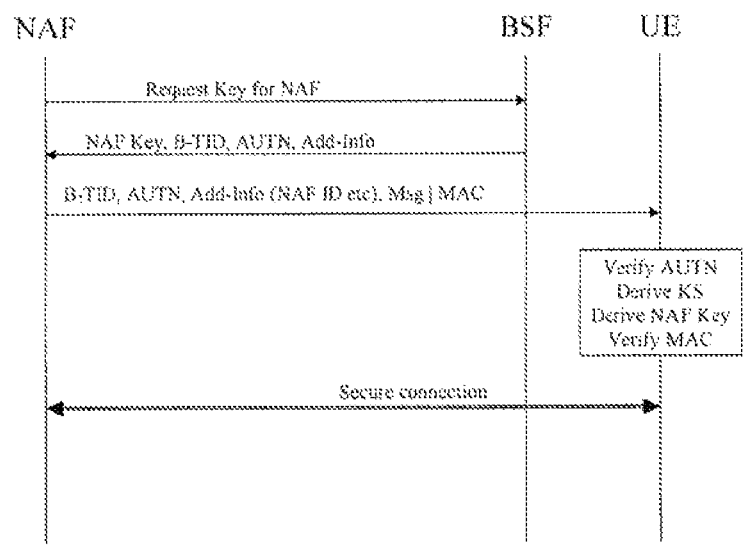
FIGS. 2 to 7 illustrate signaling flows associated with respective procedures for establishing a security association between a client (UE) and NAF.

The signaling exchanges associated with this procedure are illustrated in FIG. 2.

In order to prevent the manipulation of the further data (required by the client) by the NAF, the BSF may sign that data using a derivative of KS. This may be important, for example, to prevent the NAF from extending the lifetime of a key.

The solution presented above allows the NAF to push to the client the information required to establish a security association between the two parties. Thus the client does not have to set up a connection with the BSF to perform these tasks. This represents an extremely time efficient solution. However, it requires that the NAF relay all key related information (key lifetime, Add-info, etc) in a protected form from the BSF to the UE. The B-TID and the other data might then comprise quit a large data structure. This might be problematic in the case where the volume of data that can be incorporated into the message structure used between the client and the NAF, e.g. where this structure is SMS.

In order to reduce the required data volume exchanged between the NAF and the client to establish the security association, the above solution may be modified by omitting the AUTN value from the data sent by the BSF to the NAF. The NAF now composes a message containing the B-TID and other necessary data (including the NAF identity) that the terminal needs to derive the NAF key and sends it to the client. Again, this message could be a message which only triggers the set-up of a security association, or it could contain encrypted payload data.

When the client receives the message from the NAF, it connects to the BSF transmitting the B-TID thereto, authenticates itself, and requests the remaining information necessary to derive the keying material associated with the B-TID, i.e. e.g. AUTN. After having received this information it derives the service (NAF) key and verifies the integrity of the message. As the client has to connect to the BSF, it can at the same time get all the information related to the keying material, i.e. Add-Info, key life time etc, thus reducing the amount of "administrative" information that has to be transmitted from the NAF to client.

Figure 3:
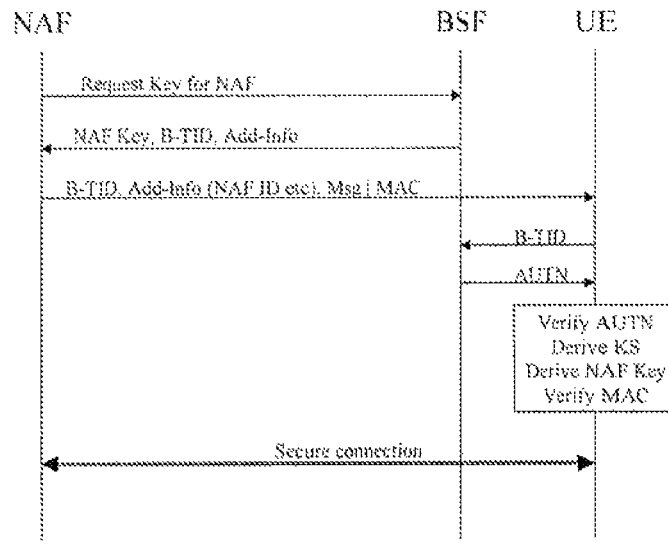

The signalling exchange associated with this procedure, assuming the KS generation scenario (i.e. analogous to FIG. 2), is shown in FIG. 3.

It may be undesirable in some circumstances to reveal the value RAND to the NAF. This may be avoided by forming the B-TID using a reference to the actual RAND value (or the effective RAND, RANDe), so that the NAF sees only the reference value. The effective RAND (RANDe) would then have to be signaled together with the AUTN from the BSF to the client. This modified procedure is illustrated in FIG. 4.

Figure 4:
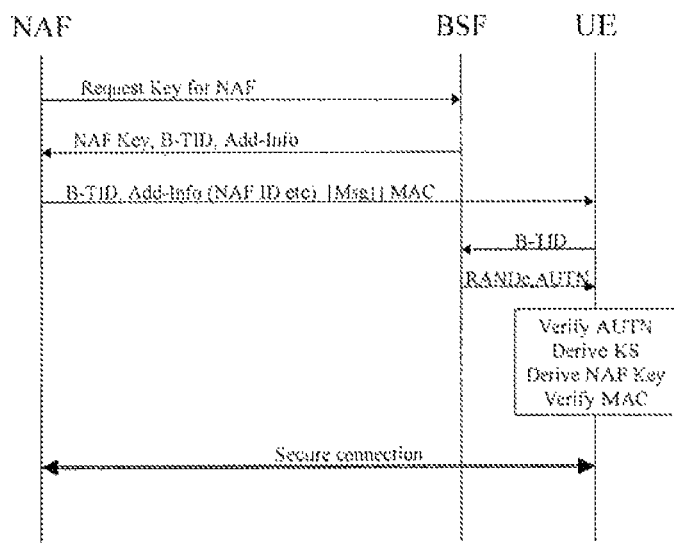

The main advantage of the solutions described with reference to FIGS. 3 and 4 is that the BSF will have a further opportunity to control the key generation in the client. The client needs the AUTN to derive the key. On the other hand, the client will have to connect to the BSF and authenticate itself towards the BSF requiring a new variant of the GBA protocol over the Ub interface.

One threat to the solutions of FIGS. 3 and 4 is that an attacker might generate a batch of messages (purporting to contain a valid B-TID) and send them to different clients to launch a Denial-of-Service (DoS) attack. As the clients have no means to authenticate the messages (i.e., a AUTN), they will connect to the BSF in an attempt to authenticate the received messages. Such an attack will, if not resisted, consume considerable resources on the part of the BSF. To make such a DoS attack more difficult, it would be desirable to enable the client to immediately check the MAC of the message pushed by the NAF in order to validate the message without having to connect to the BSF. To achieve this, the client has to be able to derive the key that is used for the MACing of the message. As the AUTN is not sent to the client in the pushed message, this derivation has to be based only on the RAND (or derived value, FIG. 4) in the B-TID.

A solution is to use the RAND (or derived value) in the B-TID to derive two keys Ck' and Ik' at the BSF. The BSF then derives a MAC key using these keys, and sends the MAC key to the NAF. This integrity key should preferably also depend on the NAF identity. Using a "fingerprint" of the other necessary information needed to derive the NAF key in the derivation of the integrity key would be one way to achieve this without having to send all the information to the UE. The NAF computes a second (short) MAC over at least a part of the data to be sent to the client, and includes the MAC in the message sent to the client. At the client, the USIM/ISIM uses the AKA algorithms to generate Ck' and Ik' and hence the second MAC key, and the client can then verify the message. Alternatively, the BSF can provide the keys Ck' and Ik' to the NAF to enable the NAF to generate the second MAC key itself. This doesn't stop replay of old message (although this could be addressed with the use of timestamps), but it does stop attackers from generating random messages.

Figure 5:
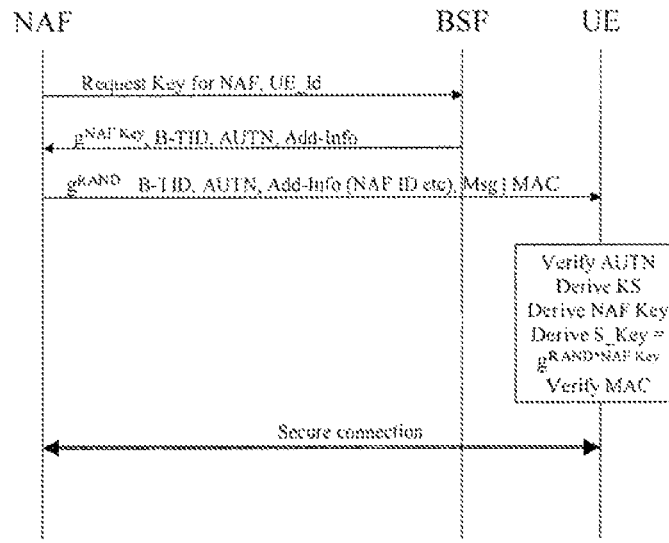

In an alternative solution, illustrated in the signaling diagram of FIG. 5, the BSF does not generate and send the NAF key itself to the NAF in response to the NAF request for a PUSH key for a given user. Rather, the BSF sends a Diffie-Hellman public value $g^{NAF\_Key}$ based on the NAF-Key (or on some other value based on the associated shared secret Ks) and data related to the identity of the involved parties and intended use of the key. The NAF may now chose a secret value RAND of its own, and append the corresponding public Diffie-Hellman value $g^{RAND}$ for that secret value to the info set to the UE. Both parties can then derive a common shared key, $S\_Key = g^{RAND*NAF\_Key}$. The S_Key is used to key the MAC. It is noted that Diffie-Hellman schemes can be implemented over different types of groups. Here we use the standard notation when the group is Zp and the generating g element used is denoted g.

Figure 6:
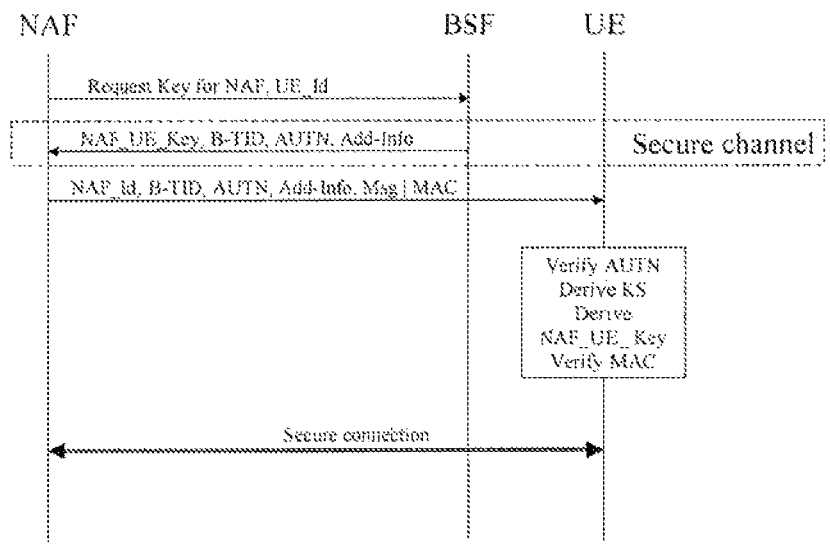

According to a still further alternative solution, illustrated in the signaling diagram of FIG. 6, when the NAF requests a PUSH key for a given user, the BSF does not include a standard NAF key but rather derives a key which relies additionally on both the UE_identity and the NAF_identity (in addition to any further data). Such a key is be denoted "NAF_UE_Key" in the Figure. In order to secure the delivery of the delivery of the key to the NAF from the BSF, the BSF includes in the message to the BSF a MAC calculated using the NAF_UE Key.

The above discussion has considered the application of the invention to the provision of service related keys to users and service nodes. Another application of the present invention relates to the provision of keys to client terminals to allow one client terminal to push messages to a peer client terminal in a secure manner, that is to say peer-to-peer (p2p) key management.

Figure 7:
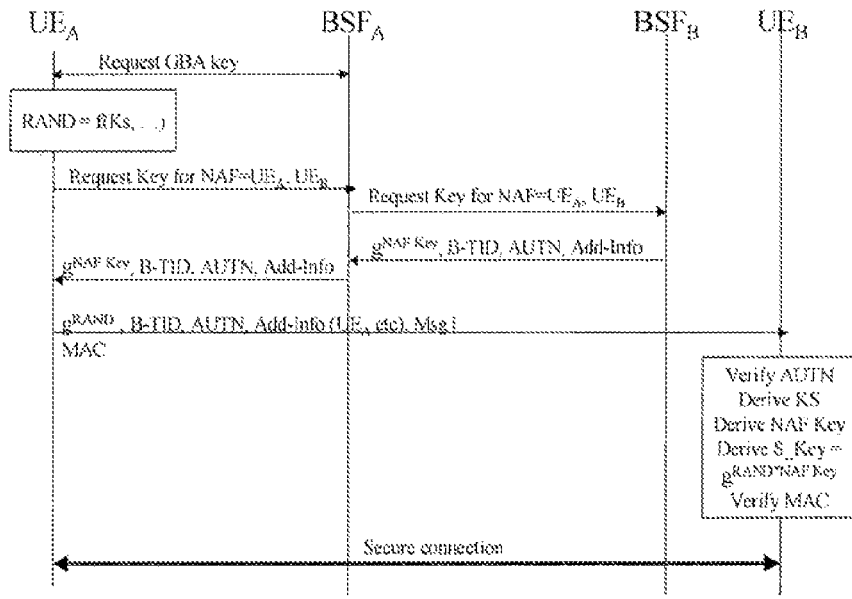

According to one solution, an initiating UE. i.e. $UE_A$, employs the method illustrated generally in FIG. 7. This approach relies upon an explicit trust relationship between $BSF_A$ and $BSF_B$. The initiating party first performs a standard GBA procedure with the $BSF_A$ of its home network in order to obtain a base key, $Ks_A$. $UE_A$ then uses the base key to derive a RAND tied to the other party $UE_B$ to which $UE_A$ wishes to push a message. This can be done in the same way as NAF keys are derived. The second action performed by $UE_A$ is to request key information for $UE_B$. This request, containing the identities of both clients, is sent to $BSF_A$, which forwards the request to the BSF within the home network of $UE_B$. i.e. $BSF_B$.

The $BSF_B$ returns to $UE_A$, via $BSF_A$, a Diffie-Hellman public value for $UE_B$, namely $g^{NAF\_Key}$. It also returns the B-TID (containing the RAND' value used to generate the NAF Key), AUTN, and required further data. The initiating party $UE_A$ then forms a message containing its public Diffie-Hellman value, $g^{RAND}$, and the information needed by the receiver to derive the $KS_B$, the related NAF_Key, and hence the session key $g^{RAND*NAF\_Key}$ $UE_A$ can of course derive the same session key.

Figure 8:
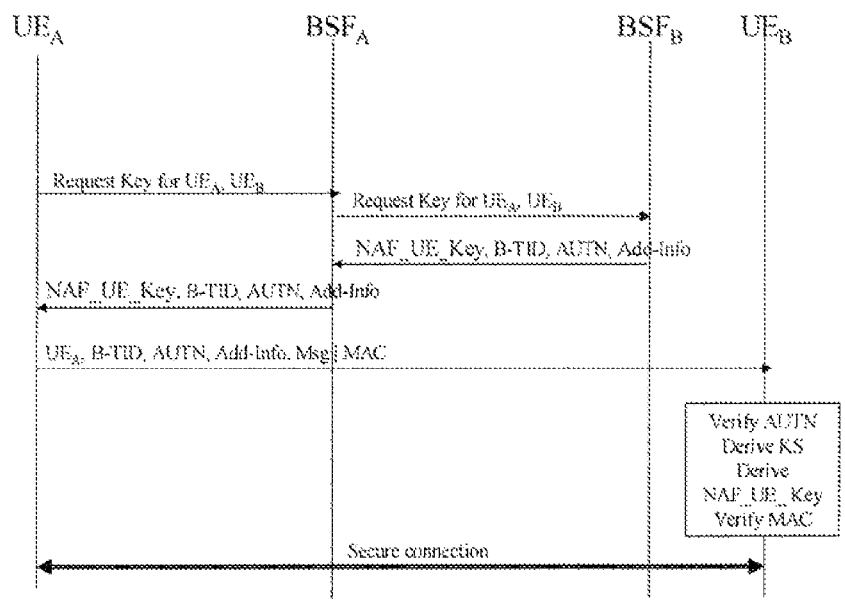
FIGS. 8 and 9 illustrate signaling flows associated with respective procedures for establishing a security association between a pair of clients ($UE_A$ and $UE_B$).

An alternative p2p key management solution is illustrated in FIG. 8 and requires that $BSF_B$ generate the key to be shared by the peers. The first action by the initiating party $UE_A$ is to request a key for the other party $UE_B$. This request is sent to the initiating party's $BSF_A$, which forwards the request to the receiving party's $BSF_B$. The initiating party includes its identity as well as that of the receiving party's in the request, and the $BSF_B$ derives the key to be shared, i.e. NAF_UE_Key. The derived key together with the B-TID, AUTN, etc is then delivered to $UE_A$.

With this scheme, the receiving party does receive an implicit verification of the sender's claimed identity as this identity is used in the NAF_UE_Key derivation. The receiving party could also get an explicit authentication if $BSF_B$ includes a MAC based on a "NAF_Key" covering all data, as described above.

It will be appreciated by the person of skill in the art that various modifications may be made to the above described embodiments without departing from the scope of the present invention. For example, whilst the solutions presented above have been concerned with GBA, the invention has general applicability to architectures where information is to be pushed from a service provider and where the service provider and the client do not share a common secret. In another modification, where multiple solutions are implemented in parallel, the authentication request sent to the BSF contains a selector indicating which solution the NAF/UE shall employ.

Figure 9:
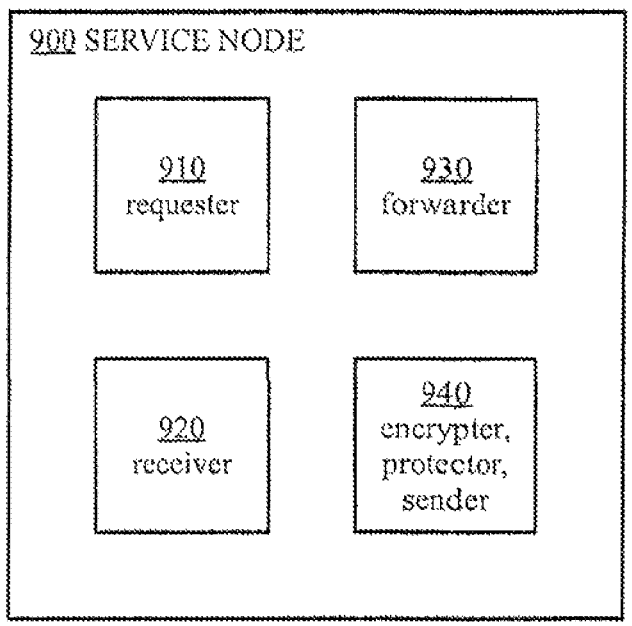

FIG. 9 illustrates an embodiment of a service node capable performing above-described operations related to the service node including delivering a push service to a client via a secure communication link. Network Application Function server is an example of the service node. As seen, service node 900 embodiment includes means 910, 920, 930 and 940. Means 910 is adapted for sending to a key generation function (illustrated in FIG. 11) a request for generation and provision of a service key. The request identifies the client illustrated in FIG. 10) and the service node. Means 920 is adapted for receiving from the key generation function the service key together with additional information. Means 930 is adapted for forwarding the additional information to the client. Means 940 is adapted for encrypting and/or integrity protecting service information using the service key and for sending the encrypted and/or protected information to the client.

Figure 10:
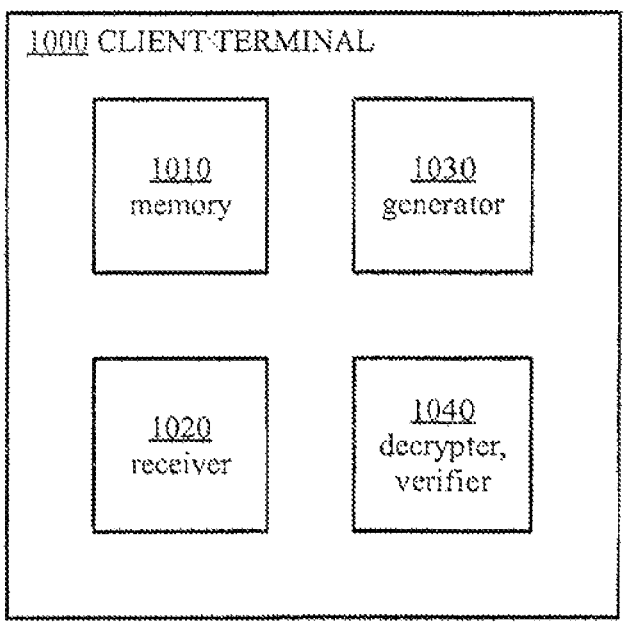

FIG. 10 illustrates an embodiment of a client terminal (or simply terminal or UE) capable of performing above-described operations related to the client including receiving a pushed service delivered by a service node. As seen, client 1000 embodiment includes means 1010, 1020, 1030 and 1040. Means 1010 is memory means adapted for storing a secret that is shared with a key generation function. Means 1020 is adapted for receiving key generation information from the service node. Means 1030 is adapted for generating a service key using the shared secret and the key generation information. Means 1040 is adapted for using the service key to decrypt and/or verify the integrity of communications with the service node.

Figure 11:
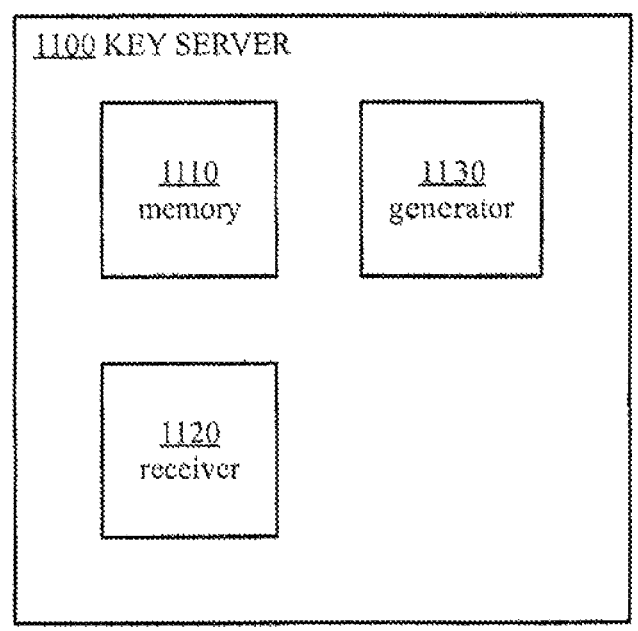

FIG. 11 illustrates an embodiment of a key generation function node for key server) capable of performing above-described operations related to the key generation function including establishing a security association between a client and a service node for the purpose of pushing information from the service node to the client. As seen, key server 1100 embodiment includes means 1110, 1120 and 1130. Means 1110 is memory means adapted for storing a secret that is shared with the client. Means 1120 is adapted for receiving a request for generation and provision of a service key from the service node. The request identifies the client and the service node. Means 1130 is adapted for generating the service key using the identities of the client and the service node, the base secret, and additional information, and adapted for sending the service key to the service node together with the additional information.

The invention claimed is:

1. A method of establishing a security association between a first node and a second node for the purpose of pushing information from the first node to the second node, wherein the second node and a key generation function share a secret, the method comprising:
   sending a request for generation and provision of a service key from the first node to a key generation function, the request containing identities of the first and second nodes;
   generating the service key at the key generation function using the identity of the first node, the secret, and additional information, signing the additional information using a derivative of the secret and sending the service key to the first node together with the additional information;
   forwarding the additional information and the identity of the first node from the first node to the second node; and
   at the second node, verifying the additional information and generating the service key using at least the received additional information, the first node identity and the derivative of the secret.

2. A method according to claim 1, wherein the first node is a service node and the second node is a client.

3. A method according to claim 2, wherein the client is a client terminal of a 3G network employing a Generic Bootstrapping Architecture, the service node comprising a Network Application Function and the key generation function comprising a Bootstrapping Server Function.

4. A method according to claim 3, the step of generating the service key at the key generation function comprising the steps of:
   generating key material KS using the secret; and
   generating the service key using the key material KS, the identity of the service node, and the additional information.

5. A method according to claim 3, the step of generating the service key at the client comprising:
   generating key material KS using the secret; and
   generating the service key using the key material KS and additional information.

6. A method according to claim 5, wherein the secret is stored in an ISIM/USIM of the client, and the step of generating the key material KS is performed within the ISIM/USIM.

7. A method according to claim 2, the step of generating the service key at the key generation function utilising values other than those sent to the client by the service node.

8. A method according to claim 7, wherein at least certain of those other values are obtained by the client from the key generation function.

9. A method according to claim 1, wherein the additional information comprises one or more of:
   a transaction identifier; and
   a network authentication value.

10. A method according to claim 2, wherein the additional information comprises a transaction identifier in a format of an NAI, the transaction identifier comprising an encoded random value generated by the key generation function, the encoded random value being used to generate the service key.

11. A method according to claim 2, wherein the additional information comprises a transaction identifier in a format of an NAI, the transaction identifier comprising a pointer to a random value generated by and stored at the key generation function, the random value being used to generate the service key, the method comprising sending a request containing the pointer from the client to the key generation function, and returning the random value to the client to enable the client to generate the service key.

12. A method according to claim 2, wherein the key generation function sends to the service node a network authentication value and the service node forwards this value to the client, together with the additional information, the client using the secret and the authentication value to authenticate the key generation function.

13. A method according to claim 2 and comprising sending a request from the client to the key generation function for an authentication value after the client has received the additional information from the service node, receiving the authentication value at the client, and authorising the security association request received from the service node on the basis of this value.

14. A method according to claim 2, wherein the additional information is forwarded from the service node to the client in a message also containing service data, the service data being encrypted and/or integrity protected with the service key, wherein the client can decrypt the encrypted data once it has generated the service key.

15. A method according to claim 1, wherein the step of generating the service key at the key generation function comprises using an identity of the second node.

16. A method according to claim 1, wherein the service key is a Diffie-Hellman key for the second node, the method further comprising the step of providing to the first node a Diffie-Hellman key for that first node, and sending the Diffie-Hellman key for the first node to the second node, the security association being established on the basis of the two Diffie-Hellman keys.

17. A method according to claim 1, wherein the first and second nodes are first and second clients respectively.

18. A method according to claim 17, wherein the key generation function comprises a key server having a trust relationship with the second client, and the request for generation and provision of the service key is sent to the key server via a second key server having a trust relationship with the first client.

19. A method according to claim 18, further comprising sending from the first node to the second node the service key obtained by the first node, and, at the first and second nodes, deriving a session key using both of the service keys.

20. A method according to claim 17, wherein the steps of forwarding the additional information from the first node to the second node, and generating the service key at the second node using the received additional information and a secret, form part of a Diffie-Hellman exchange procedure.

21. A service node arranged to deliver a push service to a client terminal via a secure communication link, the service node comprising:
    a transmitter arranged to send a request for generation and provision of a service key to a key server, the request identifying the client terminal and the service node;
    a receiver arranged to receive from the key server the service key together with additional information, the additional information having been signed using a derivative of a secret shared by the client terminal and a key generation function;
    a forwarder arranged to forward the additional information to the client terminal; and
    an encrypter/protector/sender arranged to encrypt and/or to protect integrity of service information using the service key and to send the encrypted/protected information to the client terminal.

22. A client terminal arranged to receive a pushed service delivered by a service node, the client terminal comprising:
    a storage medium for storing a secret that is shared with a key generation function;
    a receiver arranged to receive from the service node key generation information, the key generation information having been signed using a derivative of the secret;
    a decrypter/verifier arranged to verify the key generation information; and
    a generator arranged to generate a service key using the key generation information; and
    wherein the decrypter/verifier is further arranged to use the service key to decrypt and/or verify the integrity of communications with the service node.

23. A client terminal according to claim 22,
    wherein the receiver is further arranged to receive from the service node a message authentication code, and
    the generator is further arranged to generate an authentication key or keys from at least a part of the key generation information, and to use the authentication key(s) to authenticate the message authentication code.

24. A client terminal according to claim 23, wherein the generator is further arranged to generate an authentication key or keys by applying the key generation information to USIM/ISIM.

25. A key server arranged to be used in establishing a security association between a client terminal and a service node for the purpose of pushing information from the service node to the client terminal, the key server comprising:
    a storage medium for storing a secret that is shared with the client terminal;
    a receiver arranged to receive a request for generation and provision of a service key from the service node, the request identifying the client terminal and the service node; and
    a generator arranged to generate the service key using the identity of the service node, the secret, and additional information, to sign the additional information using a derivative of the secret, and to send the service key to the service node together with the additional information.

26. A method of establishing a security association between first and second clients for the purpose of pushing information from the first client to the second client, where the first and second clients have trust relationships with first and second key servers respectively and share a secret with their respective key servers, the method comprising:
    sending a request for generation and provision of a service key from the first client to the second key server via the first key server, the request identifying the first and second clients;
    generating the service key at the second key server using the identity of the first client, the secret, and additional information, signing the additional information using a derivative of the secret, and sending the service key to the first client together with the additional information;
    forwarding the additional information from the first client to the second client; and
    at the second client, verifying the additional information using the derivative of the secret, and generating the service key using the received additional information and the secret.

27. A method in a client for receiving a pushed service delivered by a service node, the method comprising:
    storing a secret that is shared with a key generation function;
    receiving from the service node, key generation information, the key generation information having been signed using a derivative of the secret;
    verifying the key generation information using the derivative of the secret;
    generating a service key using the key generation information and the secret; and
    using the service key to decrypt and/or verify the integrity of communications with the service node.

28. A method according to claim 27 further comprising receiving from the service node a message authentication code, generating an authentication key or keys from at least a part of the key generation information, and using the authentication key(s) to authenticate the message authentication code.

29. A method according to claim 28, wherein the step of generating an authentication key or keys is performed by applying the key generation information to a USIM/ISIM.

* * * * *